United States Patent
Chen et al.

(10) Patent No.: US 10,783,641 B2
(45) Date of Patent: *Sep. 22, 2020

(54) SYSTEMS AND METHODS FOR ADAPTIVE HISTOPATHOLOGY IMAGE UNMIXING

(71) Applicant: Ventana Medical Systems, Inc., Tucson, AZ (US)

(72) Inventors: Ting Chen, San Jose, CA (US); Srinivas Chukka, San Jose, CA (US); Anindya Sarkar, Milpitas, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,814

(22) Filed: Mar. 20, 2019

(65) Prior Publication Data
US 2019/0220981 A1    Jul. 18, 2019

Related U.S. Application Data (63) Continuation of application No. 15/084,467, filed on Mar. 29, 2016, now Pat. No. 10,395,371, which is a
(Continued)

(51) Int. Cl.
*G06T 7/11*   (2017.01)
*G06K 9/00*   (2006.01)

(52) U.S. Cl.
CPC .............. *G06T 7/11* (2017.01); *G06K 9/0014* (2013.01); *G06T 2207/10024* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,922,915 A | * | 5/1990 | Arnold | A61B 6/583 378/18 |
| 8,126,205 B2 | * | 2/2012 | Levenson | G01N 21/23 382/103 |

(Continued)

FOREIGN PATENT DOCUMENTS

| | | |
|---|---|---|
| JP | 2010512508 | 4/2010 |
| JP | 201195225 | 5/2011 |

(Continued)

OTHER PUBLICATIONS

Berger et al., Color Deconvolution and Support Vector Machines, Computational Forensics, Aug. 13, 2009, pp. 174-180, vol. 174.
(Continued)

*Primary Examiner* — Tsung Yin Tsai
(74) *Attorney, Agent, or Firm* — Kilpatrick Townsend & Stockton LLP

(57) ABSTRACT

The present invention relates to systems and methods for adaptively optimizing broadband reference spectra for a multi-spectral image or adaptively optimizing reference colors for a bright-field image. The methods and systems of the present invention involve optimization techniques that are based on structures detected in an unmixed channel of the image, and involves detecting and segmenting structures from a channel, updating a reference matrix with signals estimated from the structures, subsequently unmixing the image using the updated reference matrix, and iteratively repeating the process until an optimized reference matrix is achieved.

20 Claims, 8 Drawing Sheets

Related U.S. Application Data continuation of application No. PCT/EP2014/070793, filed on Sep. 29, 2014.

(60) Provisional application No. 61/884,974, filed on Sep. 30, 2013.

(52) U.S. Cl.
CPC .............. *G06T 2207/10056* (2013.01); *G06T 2207/10064* (2013.01); *G06T 2207/30024* (2013.01)

(56) References Cited

U.S. PATENT DOCUMENTS

| | | | |
|---|---|---|---|
| 8,290,236 B2 | 10/2012 | Lett et al. | |
| 10,181,180 B2* | 1/2019 | Sarkar | G06T 5/003 |
| 10,395,371 B2* | 8/2019 | Chen | G06K 9/0014 |
| 2007/0053573 A1* | 3/2007 | Rabinovich | G06K 9/0014 |
| | | | 382/133 |
| 2008/0212866 A1 | 9/2008 | Lett et al. | |
| 2009/0226059 A1* | 9/2009 | Levenson | G06T 7/143 |
| | | | 382/128 |
| 2009/0245611 A1* | 10/2009 | Can | G06K 9/0014 |
| | | | 382/133 |
| 2010/0034453 A1 | 2/2010 | Lynch | |
| 2010/0075373 A1* | 3/2010 | Hoyt | G06K 9/00147 |
| | | | 435/40.5 |
| 2010/0201800 A1 | 8/2010 | Yamamoto et al. | |
| 2011/0249911 A1 | 10/2011 | Determan et al. | |
| 2011/0256631 A1* | 10/2011 | Tomaney | C12Q 1/6874 |
| | | | 436/94 |
| 2014/0310635 A1 | 10/2014 | Lett et al. | |
| 2014/0314301 A1* | 10/2014 | Azar | G06T 7/0012 |
| | | | 382/133 |
| 2015/0213614 A1* | 7/2015 | Maddah | G06T 7/246 |
| | | | 382/133 |
| 2016/0035100 A1* | 2/2016 | Bamford | G06T 7/10 |
| | | | 382/131 |
| 2016/0098590 A1* | 4/2016 | Bredno | G06K 9/00127 |
| | | | 382/133 |

FOREIGN PATENT DOCUMENTS

| | | |
|---|---|---|
| JP | 2014525028 | 9/2014 |
| WO | 2007103037 A2 | 9/2007 |
| WO | 2012091056 | 7/2012 |
| WO | 2012152693 A1 | 11/2012 |

OTHER PUBLICATIONS

Gavrilovic et al, Blind Color Decomposition of Histological Images, IEEE Transactions on Medical Imaging, Jun. 2013, pp. 983-994, vol. 32, No. 6.

International Search Report dated Feb. 4, 2016 received in corresponding PCT Application No. PCT/EP2014/070793.

Japanese Patent Office: Japanese Office Action dated Jun. 26, 2018 in corresponding Japanese Application 2016517350.

Macenko et al., A Method for Normalizing Histology Slides for Quantitative Analysis, Biomedical Imaging: From Nano to Macro, IEEE International Symposium Jun. 28, 2009, pp. 1107-1110.

Ruifrok et al., Quantification of Histochemical Staining by Color Deconvolution, Analytical and Quantitative Cytology and Histology, Aug. 2001, pp. 291-299, vol. 23, No. 4.

* cited by examiner

SYSTEMS AND METHODS FOR ADAPTIVE HISTOPATHOLOGY IMAGE UNMIXING

CROSS-REFERENCE TO RELATED APPLICATIONS

This is a continuation of U.S. patent application Ser. No. 15/084,467 filed Mar. 29, 2016, which is a continuation of International Patent Application No. PCT/EP2014/070793 filed Sep. 29, 2014, which claims priority to and the benefit of U.S. Provisional Patent Application No. 61/884,974 filed Sep. 30, 2013, all of which prior applications are incorporated herein by reference as if set forth in their entirety.

FIELD OF INVENTION

The present invention relates to the unmixing of images, for example, histopathology images, in fluorescence microscopy or bright-field microscopy. More particularly, the present invention relates to dynamically and adaptively refining reference spectra for a multi-spectral image or reference colors for the bright-field image.

BACKGROUND

In a multiplex fluorescent slide of a tissue specimen, different nuclei and tissue structures are simultaneously stained with specific fluorescent dyes, organic fluorescent dyes, or fluorescent counter stains, each of which fluoresces in a different spectral band, while generally overlapping in the 400 nm-850 nm spectral range. More recently, quantum dots are widely used in immunofluorescence staining for the biomarkers of interest due to their intense and stable fluorescence. On a typical multiplex slide, a nuclei marker, for example, a 4',6-diamidino-2-phenylindole (DAPI) fluorescent stain (i.e., a blue stain), is used along with the quantum dots. However, other nuclei counter stains may be used, such as, for example, other fluorescent counter stains. The slide is then imaged using a multi-spectral imaging system (such as a fluorescent microscope system that is coupled to a camera or a scanner; or a whole slide scanner). Each channel of the imaging system corresponds to a spectral narrow-band filter. The multi-spectral image stack produced by the imaging system is therefore a mixture of the underlying biomarker expressions, which, in some instances, may be co-localized.

In brightfield unmixing, the nuclei and tissue structures are stained with hematoxylin and eosin (H&E) or IHC staining. The slide is then scanned with the bright-field scanner equipped with CCD color camera and finally the RGB image is acquired. Similarly to the multi-spectral image analysis, the reference colors of the RGB image are obtained from the scanned single stain bright-field images.

Taking the multi-spectral image unmixing as an example, to identify the individual constituent fluorescent dyes for the biomarkers and the proportions they appear in the mixture, spectral unmixing is used to decompose each pixel of the multi-spectral image into a collection of constituent spectrum endmembers (or reference spectra) and the fractions of their intensity contributions in the multi-spectral image from each of them. The reference spectrum for a stain corresponds to the emission spectral signature for the particular stain (e.g., fluorescent dye), when the stain is irradiated with spectra, for example, light of varying excitation wavelengths. The amount of endmember contribution is also referred to as abundance, and corresponds to a pixel value in the unmixed image, for example the grayscale pixel values in the DAPI or quantum dot unmixed images.

Accurate spectral unmixing of fluorescent images is clinically important because it is one of the key steps in multiplex histopathology image analysis. Several techniques have been proposed for spectral unmixing in the field of remote sensing, for example. One popular approach is solving for the abundances given the reference spectra within the non-negative least square (NNLS) framework. In this case, accurate estimation of the endmember contributions requires precise knowledge about the reference spectra. Unlike the applications in the domain of remote sensing where different objects such as grass and rocks can be easily identified from the scene, the biomarkers are often co-localized in histopathology fluorescent images, therefore making it difficult to extract the endmember spectra from the image and solve for the abundances. While the narrow-band reference spectra for quantum dot or nanocrystal biomarkers can be precisely measured from single stained control slides, broadband signals such as DAPI and tissue auto-fluorescence (AF) are slide-specific and exhibit variation between images and slide specimens. The broad-band spectra overlap with the narrow-band spectra, making the accurate estimation of the quantum dot abundances (i.e., the unmixed images) even more difficult. In addition, part of the DAPI spectrum may be wrongly estimated as AF because the spectral signatures of DAPI and AF are similar to each other, which may lead to an erroneous estimation of the nuclear component.

To simultaneously estimate the reference spectra, as well as the endmember contributions, non-negative matrix factorization (NMF) is used widely for blind spectral unmixing. However, due to the non-linearity of the problem, this method is not guaranteed to converge to a physically meaningful and relevant solution. This is especially relevant for the DAPI estimation because it is possible for NMF to worsen with every iteration for the same reason that the DAPI spectrum can be confused with other similar reference spectra, such as AF. NMF automatically solves for the reference spectral matrix, however the algorithm is not able to identify which reference spectrum corresponds to DAPI and which one corresponds to AF. Additional frameworks proposed based on the orthogonality assumption (i.e., the assumption that the reference spectrum of DAPI is orthogonal to that of quantum dots) of the endmember do not yield meaningful results for real data. Accurate DAPI unmixing is of great clinical importance because it is the most common nuclear stain. Moreover, nuclei detection serves as a first step in digital pathology image analysis, with further analysis tasks being based on the reliable identification of cell nuclei. Thus, there is a need for precise unmixing results. In the case of bright-field images, hematoxylin plays an equivalently important role as DAPI in multi-spectral images. Hence, the correct unmixing of hematoxylin is also very important.

SUMMARY OF THE SUBJECT DISCLOSURE

The subject disclosure presents systems and methods for adaptively optimizing the reference spectra for a multi-spectral image or reference colors for bright-field image. Here, the updating of the broadband spectra of the multi-spectral image is an example to explain the process, however, the same procedure can be applied to the updating of the reference colors of the bright-field images. This adaptive optimization is based on structures detected in an unmixed broadband channel of the image. Embodiments disclosed herein perform operations including detecting and segmenting structures, such as nuclei from an unmixed image of broadband channel, tissue structures, and boundaries thereof, and updating a reference matrix with one or more broadband signals estimated from the identified structures and their surrounding regions. A confidence level for each structure may be determined based on the structure's shape and grayscale intensity information and biological criteria, with broadband signatures from only high-confidence structures being used to update the reference spectra in the reference matrix. An updated reference spectra is estimated from the high-confidence structure regions by obtaining the pixel values from the original multi-spectral image and using that to replace the existing reference spectra in the reference matrix. A subsequent unmixing operation using the updated reference matrix yields improved results. The reference spectra updating and subsequent unmixing may be iteratively repeated until an optimized reference matrix is achieved. The optimization may be based on reaching a threshold number of iterations, or convergence or stabilization of the reference matrix, or any combination thereof. The optimized reference matrix yields reliable unmixing of the hyper-spectral data that are superior when compared to existing methods. The unmixing operations may be performed on the same or different regions of the image, or the entire image repeatedly. Custom regions may be defined to enable analysis of images having varying broadband signatures. Separate operations may be executed in parallel on different regions, enabling efficient processing of large numbers of multiplex fluorescent slides. In an exemplary embodiment of the present invention, a non-transitory computer-readable medium for storing computer-executable instructions that are executed by a processor to perform operations is disclosed that involves utilizing a reference matrix comprising an initial reference spectra or colors to unmix an image or regions of an image comprising a mixture of signals; estimating an updated reference spectra or colors for the image or regions of the image; and updating the reference matrix with the updated reference spectra or reference colors; wherein the updated reference spectra or reference colors are used in a subsequent unmixing operation. In an exemplary embodiment of the present invention, the unmixed channels may be one or more of a 4',6-diamidino-2-phenylindole (DAPI) signal, or an autofluorescence signal, and hematoxylin (HTX) signals.

In one embodiment of the present invention, a system for image unmixing involves a processor; and a memory coupled to the processor, the memory to store computer-executable instructions that, when executed by the processor, cause the processor to perform operations comprising: estimating a reference spectra for a stain from a highly ranked subset of a plurality of structures detected from an unmixed signal corresponding to that stain; and unmixing the image using the reference spectra; wherein the estimating and unmixing are repeated until an optimal reference spectra is acquired.

In another embodiment of the present invention, a method is disclosed that involves unmixing an image comprising a mixture of signals;
detecting a plurality of structures in the unmixed signal; ranking the plurality of structures in order of a confidence level; estimating a reference spectra for a stain from a subset of structures among the plurality of structures that have a confidence level higher than a threshold confidence level; storing the reference spectra in a reference matrix associated with the image; and subsequently unmixing the image using the reference matrix.

In another embodiment of the present invention, a non-transitory computer-readable medium for storing computer-executable instructions is disclosed that is executed by a processor to perform operations, including utilizing a reference matrix having an initial reference vector to unmix a first region of an image comprising a mixture of signals, and generate an unmixed first region of the image; estimating updated reference spectra for the unmixed first region and generating an updated reference vector for the unmixed first region; and updating the reference matrix with the updated reference vector, wherein the updated reference vector is used in a subsequent unmixing operation.

In yet another embodiment of the present invention, a system for unmixing an image is disclosed comprising a processor; and a memory coupled to the processor, the memory stores computer-executable instructions that, when executed by the processor, cause the processor to perform operations comprising: estimating reference vector for a stain from a highly ranked subset of a plurality of structures detected from an unmixed signal corresponding to the stain; and unmixing the image using the reference spectra, wherein the estimating and unmixing are repeated until an optimal reference spectra is acquired.

In yet another embodiment of the present invention, a method for unmixing is disclosed, comprising: unmixing an image comprising a mixture of signals and generating unmixed signals; detecting a plurality of structures in the unmixed signals; ranking the plurality of structures in order of a confidence level; estimating a reference vector for a stain, shown in the image, from a subset of structures among the plurality of structures that have a confidence level higher than a threshold confidence level; storing the reference vector in a reference matrix associated with the image; and subsequently unmixing the image using the reference matrix.

DETAILED DESCRIPTION OF THE SUBJECT DISCLOSURE

The subject disclosure presents systems and methods for adaptively optimizing the broadband reference spectra for an image comprising a plurality of fluorescent channels or updating the reference color for a bright-field image. For each region of an image, we update the reference vector, i.e. a reference spectrum in the case of a fluorescence image and a reference color in the case of a bright field image spectra and unmix the region till convergence. As an example application, this disclosure presents the details of the reference spectral refinement method for multi-spectral images, but the same technique can be applied to the bright-field images.

Taking the fluorescent image as an example, this adaptive optimization is based on structures detected in an unmixed broadband channel of the image. For instance, a slide holding a sample material may be scanned using a scanner coupled to a fluorescence or brightfield microscope system to generate a scanned image. The image is stored on a computer-readable medium, and contains a mixture of several fluorescent or color channels, including one or more broadband channels, such as a DAPI channel. Exemplary embodiments disclosed herein detect nuclear and tissue regions from a broadband channel in an unmixed image and refine the reference spectra with the broadband signatures of the biomarkers within these regions of the image. A linear spectral unmixing process such as a non-negative least-squares method shown herein may be utilized to separate the component fluorescent channels. The image may comprise a mixture of endmember spectra including DAPI and AF, in addition to one or more quantum dots, as described above, that are initially unmixed using an initial reference matrix. The initial reference spectra for each marker may be retrieved from control data, a control image, or may be estimated from the image under observation. For instance, the initial broadband reference signal for the stain, or initial reference spectra, may be determined by observing a ubiquitous dispersion of a unique signature of the stain throughout the image or a region of the image, and identifying the signal based on a comparison of the stain's signature spectra emissions/output when illuminated with a known signature associated with the stain. The initial reference spectra for a particular stain may be retrieved from a database containing one or more reference matrices. The initial reference spectra or reference colors may correspond to a reference matrix used in an unmixing operation.

Embodiments disclosed herein perform operations including observing the unmixed broadband signal, detecting and segmenting structures such as nuclei from the unmixed broadband signal channel, tissue structures, and boundaries thereof, and estimating updated reference spectra from the detected structures. One or more broadband signals observed from these structures and their surrounding regions may be used as values in an updated reference matrix that is used in a subsequent unmixing operation. Moreover, shape and intensity information of the structures in a region of the image, along with biological criteria, may be applied in a determination of a confidence level for each structure. The detected structures may be scored to generate the confidence level, with reference spectra from only high-confidence structures being used in the subsequent unmixing operation. Further embodiments disclosed herein perform operations including ranking detected structures such as nuclei based on one or more criteria. For instance, a subset of the detected nuclei that are scored with a confidence level higher than a threshold may be accepted as true positives. These accepted structures are observed to automatically estimate an updated reference spectra. For instance, the value of the updated reference spectrum from the selected nuclei may replace the initial DAPI reference spectrum in an updated reference matrix. A subsequent unmixing operation using the updated reference matrix therefore yields improved results.

The reference spectra estimation and subsequent unmixing may be repeated and the reference spectra may be updated iteratively until an optimized reference matrix is achieved. The subsequent unmixing may be performed on all the nuclei within the image or region thereof, or may be performed on high-confidence nuclei, or separate subsets of nuclei, and any combination thereof. The determination of an optimized reference spectra may depend on a threshold number of iterations, or convergence or stabilization of the reference matrix, or any combination thereof. The optimized reference matrix yields reliable unmixing of the hyperspectral data that are superior when compared to existing methods. For instance, an unmixing operation using optimized DAPI reference spectra may generate sharper contours between nuclei and surrounding tissue.

Moreover, subsequent unmixing operations may be performed on the same or different regions of the image, or the entire image repeatedly. For instance, a sparse grid (i.e., a grid having a large distance within any two vertices) may be imposed over the image, and structures within a distance of one or more grid vertices may be sampled for estimated reference spectra. Custom regions may be defined based on structures or features observed in the image, with separate optimized reference matrices per region enabling analysis of images having varying broadband signatures. Separate operations may be executed in parallel on different regions, enabling efficient processing of large numbers of multiplex fluorescent slides. Subsequent unmixing operations may be performed on all structures within a region, or on separate subsets of structures based on a confidence level of the structures and surrounding regions, and other biological criteria.

Figure 1:
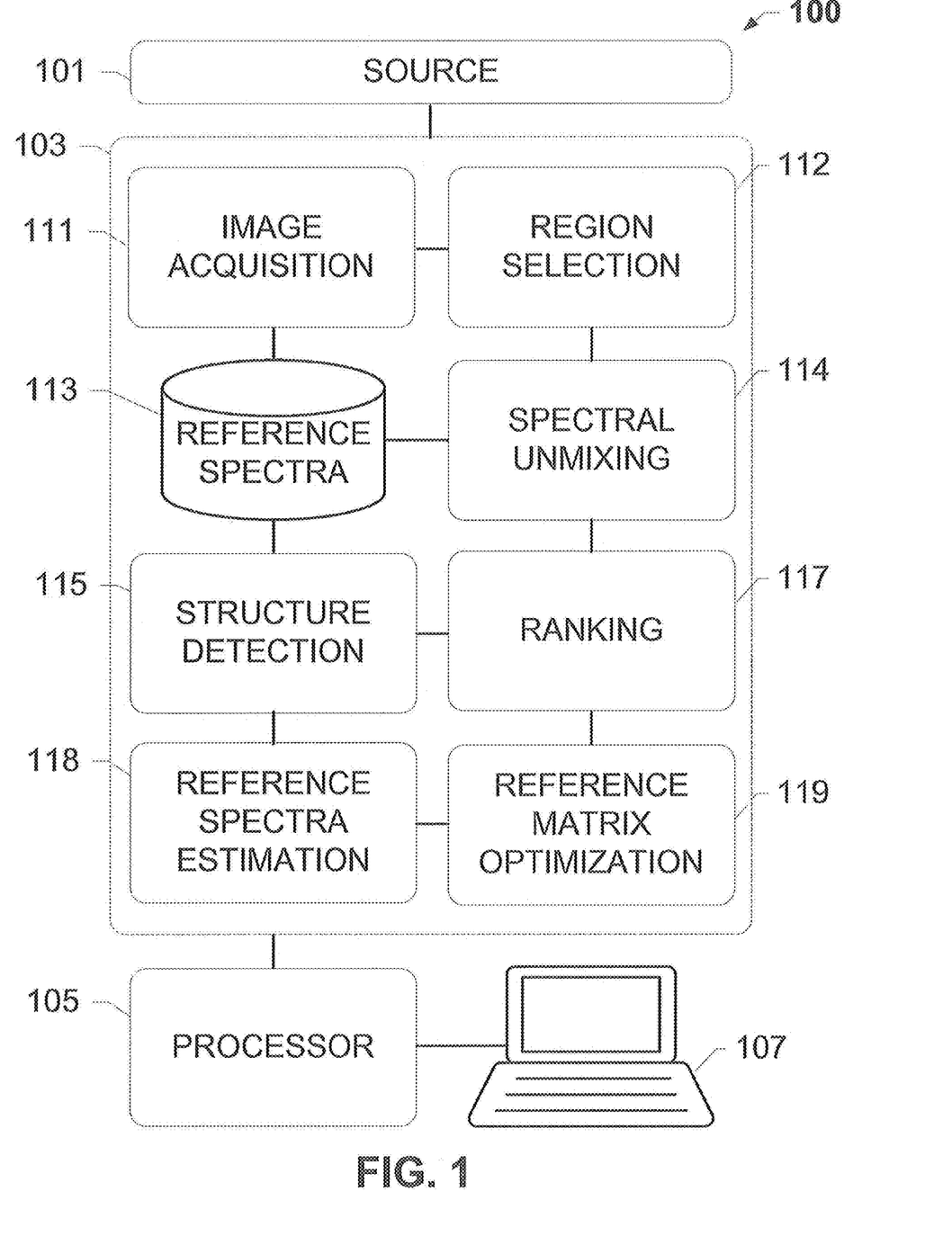
FIG. 1 shows a system for adaptive spectral unmixing, according to an exemplary embodiment of the present subject disclosure.

FIG. 1 shows a system 100 for adaptive spectral unmixing, according to an exemplary embodiment of the present subject disclosure. System 100 comprises a source 101 for generating an image, for example a fluorescent image. Other types of images are also within the purview of the subject disclosure, such as an immunohistochemical (IHC) bright-field image with hematoxylin/eosin, and other stains. For instance, source 101 may be a fluorescence microscope generating a fluorescent image, or a bright-field microscope generating an RGB image. Source 101 is in communication with a memory 103, which includes a plurality of processing modules or logical operations that are executed by processor 105 coupled to interface 107. For instance, a sample, such as a biological specimen, may be mounted on a slide or other substrate or device for purposes of imaging by a microscope coupled to memory 103, with analysis of images of the specimen being performed by processor 105 executing one or more of the plurality of modules stored on memory 103 in accordance with the present disclosure. The analysis may be for purposes of identification and study of the specimen. For instance, a biological or pathological system may study the specimen for biological information, such as the presence of proteins, protein fragments or other markers indicative of cancer or other disease, or for other purposes such as genomic DNA detection, messenger RNA detection, protein detection, detection of viruses, detection of genes, or other.

The specimen may be stained by means of application of one or more different stains that may contain one or more different quantum dots, fluorophore(s), or other stains. The number N of stains, for example, fluorophores that are applied to the specimen can vary. The fluorophores may comprise one or more nano-crystalline semiconductor fluorophores (i.e., quantum dots), each producing a peak luminescent response in a different range of wavelengths. Quantum dots are well known, and may be commercially available from Invitrogen Corp., Evident Technologies, and others. For example, the specimen may be treated with several different quantum dots, which respectively produce a peak luminescent response at 565, 585, 605, and 655 nm. One or more of the fluorophores applied to the specimen may be organic fluorophores 14 (e.g., DAPI, Texas Red), which are well known in the art, and are described in at least commonly-owned and assigned U.S. Pat. No. 8,290,236, the contents of which are incorporated by reference herein in their entirety. Moreover, a typical specimen is processed in an automated staining/assay platform that applies a stain containing quantum dots and/or organic fluorophores to the specimen. There are a variety of commercial products on the market suitable for use as the staining/assay platform, one example being the Discovery™ automated slide staining platform of the assignee Ventana Medical Systems, Inc.

After preliminary tissue processing and staining, the specimen is supplied to an image acquisition module 111 to generate a digital image of the specimen observed at source 101. Image acquisition module 111 may be coupled to, for instance, a scanner or spectral camera that is used for imaging a slide containing a sample of a material stained with a fluorescent stain and a light source for illuminating the specimen at wavelengths intended to produce a luminescent response from the fluorophores applied to the specimen. In the case of quantum dots, the light source may be a broad spectrum light source. Alternatively, the light source may comprise a narrow band light source such as a laser. The camera platform may also include a microscope having one or more objective lenses and a digital imager, as well as a set of spectral filters. Other techniques for capturing images at different wavelengths may be used. Camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure. The image may be supplied to computer-readable medium 103, either via a cable connection between the source 101 and computer 107, via a computer network, or using any other medium that is commonly used to transfer digital information between computers. The image may also be supplied over the network to a network server or database for storage and later retrieval by computer 107. Besides processor 105 and memory 103, computer 107 also includes user input and output devices such as a keyboard, mouse, stylus, and a display/touchscreen. As will be explained in the following discussion, processor 105 executes modules stored on memory 103, performing analysis of the image, morphological processing of the image or image data derived from such images, quantitative analysis, and display of quantitative/graphical results to a user operating computer 107.

For instance, as described above, a slide, holding a specimen, is observed at source 101, and a scanned image comprising a mixture of several fluorescent channels including one or more broadband signals is generated at image acquisition module 111 as described above. Region selection module 112 enables automated or manual delineation of the image into one or more regions. This enables subsequent unmixing operations to be performed on the same or different regions of the image, enabling efficient processing of multiple regions of one image or multiple images. For instance, a grid, such as a sparse grid may be imposed over an image, and structures within a distance of one or more grid vertices may be sampled for estimated reference spectra, as further described herein. The grid size may be optimized for speed or for detailed processing, and may be defined by a user of the system. Custom regions may be defined based on structures or features observed in the image, with separate optimized references per region enabling analysis of images having varying broadband signatures. The custom regions may be automatically determined based on image analysis, tissue heterogeneity, etc., or may be selected by the user. Separate operations may be executed in parallel on different regions, enabling efficient processing of large numbers of multiplex slides, for example, fluorescent slides. A region containing predominantly or purely broadband signals without any quantum dot signals may be selected to determine an initial reference spectra or estimated reference spectra as described herein.

A spectral unmixing module 114 may be executed to unmix the image or selected regions of the image using a non-negative least-squares method as shown herein for separating the component fluorescent channels. The image may comprise a mixture of endmember spectra including DAPI and AF, in addition to one or more quantum dots, as described above, that are initially unmixed using initial reference spectra. The initial reference spectra may be retrieved from a control image, or may be estimated from the image under observation. The initial reference spectra may be retrieved from a database containing one or more reference matrices, such as reference spectra database 113. The initial reference spectra may be acquired from a reference matrix used in an unmixing operation.

The initial broadband reference signal, or initial reference signal, may further be determined by observing a ubiquitous dispersion of a unique signature throughout the image or a region of the image. For instance, a ubiquitously-dispersed broadband signal may be identified as a DAPI signal based on a comparison of its signature with a known signature from a known broadband signal (i.e. DAPI sampled from a control slide). As described above, one or more initial reference spectra may be acquired from a control image or determined from the image under observation. The initial reference spectra may be estimated based upon a comparison of a measured broadband signature with known broadband signals stored in reference spectra database 113. One or more broadband signatures within the image may be recognized by its unique signature and ubiquitous dispersion through the image. Certain regions of the image may be determined to contain predominantly, or only, a broadband signal, such as autofluorescence, etc. The profile of these broadband signals along with their ubiquitous dispersion throughout the image support an assumption that these recognized signals may be used as initial reference spectra for unmixing. Moreover, upon determining a component signal having a broadband signature, the component signal may be compared with known broadband signatures specific to, for examples stains and/or the specimen being analyzed. For instance, a system for anatomical or clinical pathology may compare a scanned slide of a tissue specimen with an image of a calibration slide containing similar tissue specimens having known broadband signatures, to identify the broadband signals in the scanned image.

Spectral unmixing module 114 unmixes the component signals of the image and/or regions thereof, wherein the weight of each stain is computed at every image pixel, given the spectral signature at each pixel, using initial reference spectra determined as discussed above. The initial reference spectra may be stored within an array or a matrix comprising a plurality of known signals, including broadband and narrowband signals corresponding to fluorophores in the image. For example, each column of a reference matrix may represent a reference spectrum corresponding to a particular stain or fluorophore. The matrix may be applied to unmix the image to enable extraction of one or more signals using a linear spectral unmixing process. A spectral signature of a single pixel in the multi-channel image is obtained as a linear combination of the spectral signatures of all the different fluorophores, each signature being weighted by the corresponding weight of each fluorophore at that pixel. In a multi-channel image, there may not be any access to the individual weight for each stain's combination; however, the spectral signature of each pixel may be retrieved. The set of spectral or target signals retrieved may be reconstructed to generate an image that is free from any noisy or unwanted spectra, and consequently fit for analysis. Moreover, a broadband channel unmixed from the image may be processed to estimate optimized reference spectra as described herein.

A structure detection module 115 may be executed to perform operations including detecting and segmenting structures such as nuclei from a broadband unmixed channel, tissue structures, and boundaries thereof. The structure detection operations include nuclear detection, and segmentation. For nuclear detection, a radial symmetric voting method may be applied to determine locations of nuclei within the image or selected region. A gradient magnitude may be computed from the unmixed result of the spectral unmixing process, and each pixel around a specified magnitude may be assigned a number of votes that is based on a summation of the magnitude within the region around the pixel. The formula for computing the gradient magnitude is given as $$\left[\frac{\partial I}{\partial x}\right]^2 + \left[\frac{\partial I}{\partial y}\right]^2,$$

where I is the image and $$\frac{\partial I}{\partial x}$$

is the gradient in the x direction while $$\frac{\partial I}{\partial y}$$

is the gradient in the y direction. A mean shift clustering operation may be performed to find the local centers within a voting image, which represents the actual location of the nucleus. A nuclear segmentation operation uses the now-known centers of the nuclei to perform morphological operations and local thresholding to segment each entire nucleus. Model based segmentation and other operations may also be performed, depending on a processing power and time requirements. For example, the nuclear segmentation operation may also involve learning a shape model of the nuclei from a training data set and using that as the prior knowledge to segment the nuclei in the testing image.

A ranking module 117 is executed to perform operations including determining a confidence level for each detected structure based on a plurality of factors, including shape and intensity information and biological criteria. These criteria may include a requirement that the structure or selected region of the image is not co-located with quantum dots or other biomarkers besides the broadband signal. In other words, a pure broadband signal is preferred, with the signal being identified as discussed above, i.e. based on matching with similar known reference spectra for DAPI, and/or a ubiquitous dispersion throughout the image or region of the image. Structures such as nuclei that overlap or co-locate with other stained structures such as tumor or tissue markers may be rejected or lowly ranked by examining the pixel intensities. Some nuclei may be rejected. For example, nuclei that are smaller or larger than a given threshold, or extremely elongated as determined by a ratio between long axes and short axes are rejected. An exemplary threshold for the ratio may be 2, i.e. any ellipse having a long axis that is greater than 2× larger than a short axis is rejected. An ellipse fitting operation may be executed to fit an ellipse on top of each segmented nucleus, with a Dice coefficient of the ellipse and the segmented nuclei being used to score the nuclei with a confidence level, as further described herein. The detected structures may be ranked in order of their scores or confidence levels as determined by their Dice coefficients and other criteria. For instance, a subset of the detected nuclei that are scored with a confidence level higher than a threshold may be accepted as true positives.

As described herein, reference spectra estimated from the highest-ranked structures, by reference spectra estimation module 118, may be used to update a reference matrix, with the updated reference matrix being used in the unmixing operations or subsequent unmixing operations. Reference spectra estimation module 118 observes broadband signatures from, for example, regions of the image corresponding to the selected or highest quality structures, and estimates reference spectra for these regions. One or more broadband signals observed from these structures and their surrounding regions may be used as values in an updated reference matrix that may be used in a subsequent unmixing operation performed by spectral unmixing module 114. For instance, a value of the reference spectra estimated from a highly-ranked nucleus (i.e., a nucleus identified as having a high confidence value) may replace the initial DAPI and/or AF reference spectra in a reference matrix. A subsequent unmixing operation using the generated reference matrix therefore yields improved results. The reference spectra estimation may be performed for a plurality of structures in the image or region of the image and median pixel values of the highly confident structure regions in the multi-spectral image may be used to determine the updated reference spectra. The updated reference spectra may be added as a value to a reference matrix stored in database 113 and used in subsequent unmixing operations.

Moreover, the reference spectra may be generated or updated iteratively until an optimized reference matrix is achieved. Reference matrix optimization module 119 determines whether or not an updated reference matrix is optimized. For instance, the reference matrix may be iteratively updated via repeated cycles of unmixing 114 and reference spectra estimation 118, with each iteration resulting in a more optimized reference matrix for the image or region of the image. The optimization may be completed upon determination of a convergence or stabilization of the reference matrix. Alternatively or in addition, an execution of a threshold number of iterations may be monitored to determine optimization. The optimized reference matrix yields improved unmixing results of the hyper-spectral data that are superior when compared to other methods. For instance, subsequent unmixing operations using optimized DAPI reference spectra stored in database 113 may generate sharper contours between nuclei and surrounding tissue. Moreover, the optimization may be repeated for different regions of the image, with each region having a separate optimized reference spectra.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 103, which includes including random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Figure 2:
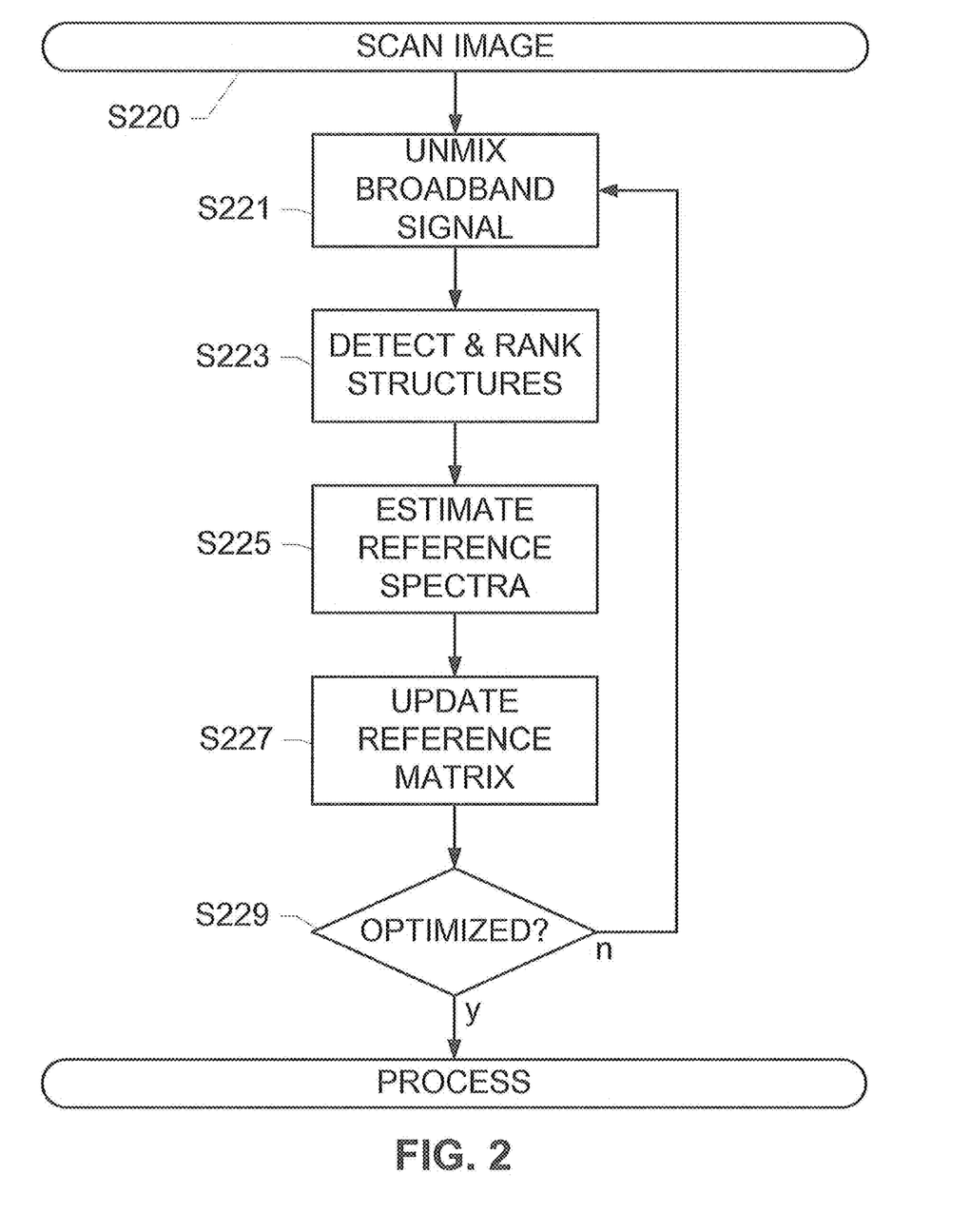
FIG. 2 shows a method for adaptive spectral unmixing, according to an exemplary embodiment of the present subject disclosure.

FIG. 2 shows a method for adaptive spectral unmixing, according to an exemplary embodiment of the present subject disclosure. The method of FIG. 2 may be performed by a computer executing modules similar to those depicted in FIG. 1. The method begins with an image of a specimen or image data that has been received from a source such as a fluorescence microscope associated with or including a scanner or spectral camera (S220), or any source that can capture image content at a range of frequencies, enabling hyperspectral or fluorescence imaging wherein the image energy is captured at multiple frequencies. The specimen may be stained by means of application of one or more different stains containing, for example, quantum dots or fluorophores that are illuminated by a light source. Subsequent to the staining, an image is captured by a detection device, for example, a spectral camera, as described above. The image is supplied to a computer that executes logical instructions stored on a memory for performing the operations described in the exemplary method.

For instance, the image or regions thereof may be unmixed to retrieve a broadband signal, such as DAPI, from the image (S221). The unmixing may utilize a non-negative least-squares method as shown herein, for separating the component fluorescent channels of the image or region thereof. The image may be delineated into one or more regions automatically or manually. This enables subsequent unmixing operations to be performed on the same or different regions of the image, enabling efficient processing of multiplex images. The initial reference spectra may be retrieved from a control image, or may be estimated from the image under observation as described herein. The initial reference spectra may be values in a reference matrix containing a plurality of reference signals that are applied to the observed mixture of signals, resulting in a plurality of unmixed component signals of the image. For instance, a matrix populated with reference spectra and a plurality of narrowband signals corresponding to the target signals may be applied to the mixture of signals, resulting in a set of component signals.

To highlight an exemplary non-negative least squares unmixing operation, let $A_{m \times n}$ be the endmember reference spectra matrix, with each column of A corresponding to an endmember spectrum that is a m-dimensional vector. $A=[a_d, a_a, a_1, \ldots, a_k]$ are the spectra for DAPI, AF and quantum dots respectively. n is the number of biomarkers/endmembers. $Y_{m \times N}$ is the multi-spectral image containing N pixels, with each pixel being a m-dimensional vector imaged from m spectral narrow-band filters. The unmixing equation shown below is formulated to minimize the overall least square errors:

$$\min_x \sum_{i=1}^{N} |Ax_i - y_i|_2^2 \text{ (subject to } x_i \geq 0)$$

with $x_i$ being a n-dimensional vector of abundances corresponding to the $i^{th}$ pixel of the unmixed images and $y_i$ being the $i^{th}$ pixel of Y. Solving the equation yields the unmixed images for the n endmembers $X_{n \times N}=[x_1, x_2, \ldots, x_N]$. More details about the non-negative least squares solution process may be found in Lawson, C. L. and R. J. Hanson, *Solving Least Squares Problems*, Prentice-Hall, 1974, Chapter 23, p. 161.

Among the resultant set of component signals is at least one broadband signal that is analyzed for a presence of structures (S223). This step includes detecting and segmenting structures such as nuclei from the at least one broadband channel data of the image, as well as identifying tissue structures, and boundaries thereof. The structure detection operations include nuclear detection, and segmentation. For nuclear detection, a radial symmetric voting method may be applied to determine locations of nuclei within the image or selected region. An image magnitude may be computed from the unmixed result of the spectral unmixing process, and each pixel around a specified magnitude may be assigned a number of votes that is based on a summation of the magnitude within a region around the pixel. A mean shift clustering operation may be performed to find the local centers within a voting image, which represents the actual location of the nucleus. Nuclear segmentation uses the now-known centers of the nuclei to perform morphological operations and local thresholding to segment the entire nucleus. Model based segmentation and other operations may also be performed, depending on a processing power and time available.

Noise in the image and a potentially inaccurate reference spectrum may lead to false positive results among detected structures. A ranking operation is therefore executed to determine a confidence level for each detected structure based on a plurality of factors, including shape and intensity information and biological criteria. These criteria include a requirement that the structure or selected region of the image is not co-localized with quantum dots by checking the signal existence at the same location for both DAPI and quantum dot images, or with other biomarkers besides the broadband signal. Structures that are smaller or larger than a given threshold, or extremely elongated as determined by the ratio between long axes and short axes are rejected. An ellipse fitting operation may be executed to fit an ellipse on top of each segmented nucleus, with a Dice coefficient of the ellipse being used to score the nuclei with a confidence level. The detected nuclei may be ranked in order of their scores or confidence levels as determined by their Dice coefficients and other criteria. For instance, a subset of the detected nuclei that are scored with a confidence level higher than a threshold may be accepted as true positives.

Reference spectra may be estimated from the highest-ranked structures (S225). This step includes observing broadband signatures such as DAPI from the highest-ranked structures within pre-defined regions of the image, and estimating updated reference spectra for these structures and their surrounding regions. The retrieved signals may be used to update or generate a reference matrix (S227) that may be used in a subsequent unmixing operation. For instance, a value of the updated reference spectrum estimated from a highly-ranked nucleus may replace the initial DAPI reference spectrum in an updated reference matrix. An unmixing operation using the generated reference spectra matrix/data or a subsequent unmixing operation using the updated reference matrix therefore yields improved results. The reference spectra estimation (S225) may be performed for a plurality of structures in the image or region of the image and a median broadband signal may be used to determine the updated reference spectra (S227). The updated reference spectra may be added as a value to a reference matrix stored in a reference database and used in subsequent unmixing operations.

Moreover, the reference spectra may be updated iteratively until an optimized reference matrix is achieved (S229). A determination that checks if a maximum number of iterations is exceeded or whether an updated reference matrix is optimized may trigger an additional unmixing (S221) process, followed by structure detection (S223), reference spectra estimation (S225), and updating (S227), with each iteration resulting in an improved reference matrix for the image or region of the image. The optimization (S229) may be completed upon determination of a convergence or stabilization of the reference matrix. A convergence may be determined by monitoring a relative difference between each updated reference spectra between two consecutive iterations. Alternatively or in addition, an execution of a threshold number of iterations may be monitored to determine optimization, with an exemplary threshold number t=100. An example loop for optimal reference spectra optimization (S229) may include the following operations:

1: Input initial reference spectra matrix $A = [a_d, a_a, a_1 \ldots, _k]$ and multi-spectral image Y
2: for $t \leq$ Max Iteration Number or $\|A_{t+1} - A_t\|^2 \leq \epsilon$ do
3:
$$\text{Solve for x: } \min_x \sum_{i=1}^{N} \left\| Ax_i - y_i \right\|_2^2 \text{ (subject to } x_i \geq 0)$$
4: Estimate the broad-band reference spectra $a_d$ and $a_a$ for DAPI and AF (Step S225 in FIG. 2) and update $A_t$ using $A_{t+1} = [a_d^{new}, a_a^{new}, a_1 \ldots, _k]$
5: end for The optimized reference matrix yields reliable unmixing of the hyper-spectral data that are improved when compared to other methods. Moreover, the optimization may be repeated for different regions of the image, with each region having a separate optimized reference spectra. The method ends when all required reference spectra in a reference spectra matrix are optimized (S229) and the image can undergo further processing.

Figure 3A:
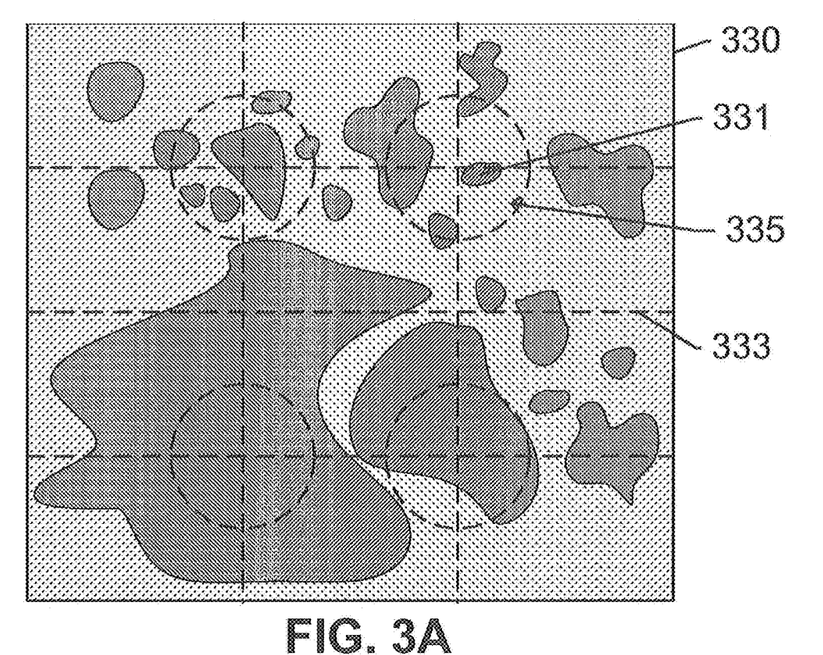
FIGS. 3A and 3B show an image divided into regions for adaptive spectral unmixing, according to an exemplary embodiment of the present subject disclosure.
Figure 3B:
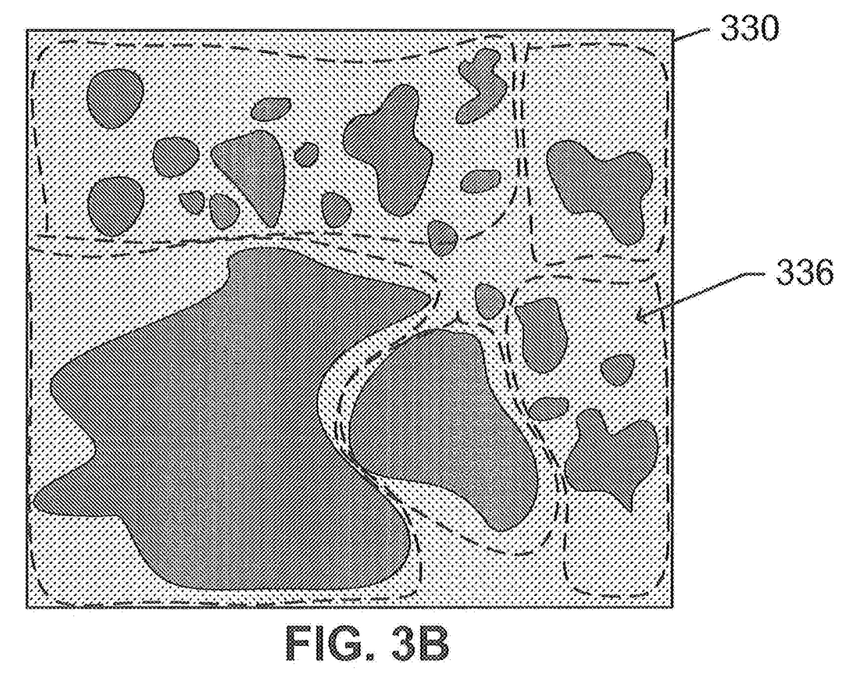

FIGS. 3A and 3B show an image 330 divided into regions for adaptive spectral unmixing, according to an exemplary embodiment of the present subject disclosure. Image 330 may be depicted on a display of a computer, and may be generated by an application such as one of the modules described in FIG. 1. Image 330 shows a specimen scanned from a slide, and depicts a plurality of structures 331. The specimen may, for example, take the form of a tissue section obtained from a human or animal subject, such as a formalin-fixed, paraffin-embedded tissue sample. The specimen may be living cellular tissue, frozen cells, tumor cells, blood, throat culture, or other; the type or nature of specimen is not particularly important. The structures may be tissue cells, nuclei, cancer cells, or any other structure.

As described herein, the image may be delineated into one or more regions, enabling parallel unmixing and optimizing operations to be performed on different regions. This may be achieved by overlaying a sparse grid over image 330, as represented by dashed lines 333 depicted in FIG. 3A. Structures within a distance of one or more grid vertices, such as nucleus 331 in region 335 may be sampled for estimated reference spectra. This enables independent processing of separate portions of the image to estimate median reference spectra for the entire image. Alternatively or in addition, the regions delineated by lines 333 may be processed independently to determine separate optimized reference spectra for each region.

Moreover, as shown in FIG. 3B, custom regions may be defined based on structures or features observed in the image. This custom segmentation enables generation of separate optimized reference spectra per region, particularly in the case of images having fluctuating DAPI channels. The custom segmentation may be determined automatically based on identification of structures in the image, i.e. using variation in intensities of pixels, tissue heterogeneity, etc. For instance, nuclei within a tumor region may be larger, triggering a separation of a tumor region from other regions of the image. A local histogram may be used to group and delineate similar regions, with subsequent detection and optimization processes being performed independently per region. Custom regions may be user-selectable via a user interface. For instance, a DAPI or broadband region may be identified and selected by a user. Moreover, the region selection may occur anytime during the process, including after an identification of high-confidence structures.

Figure 4:
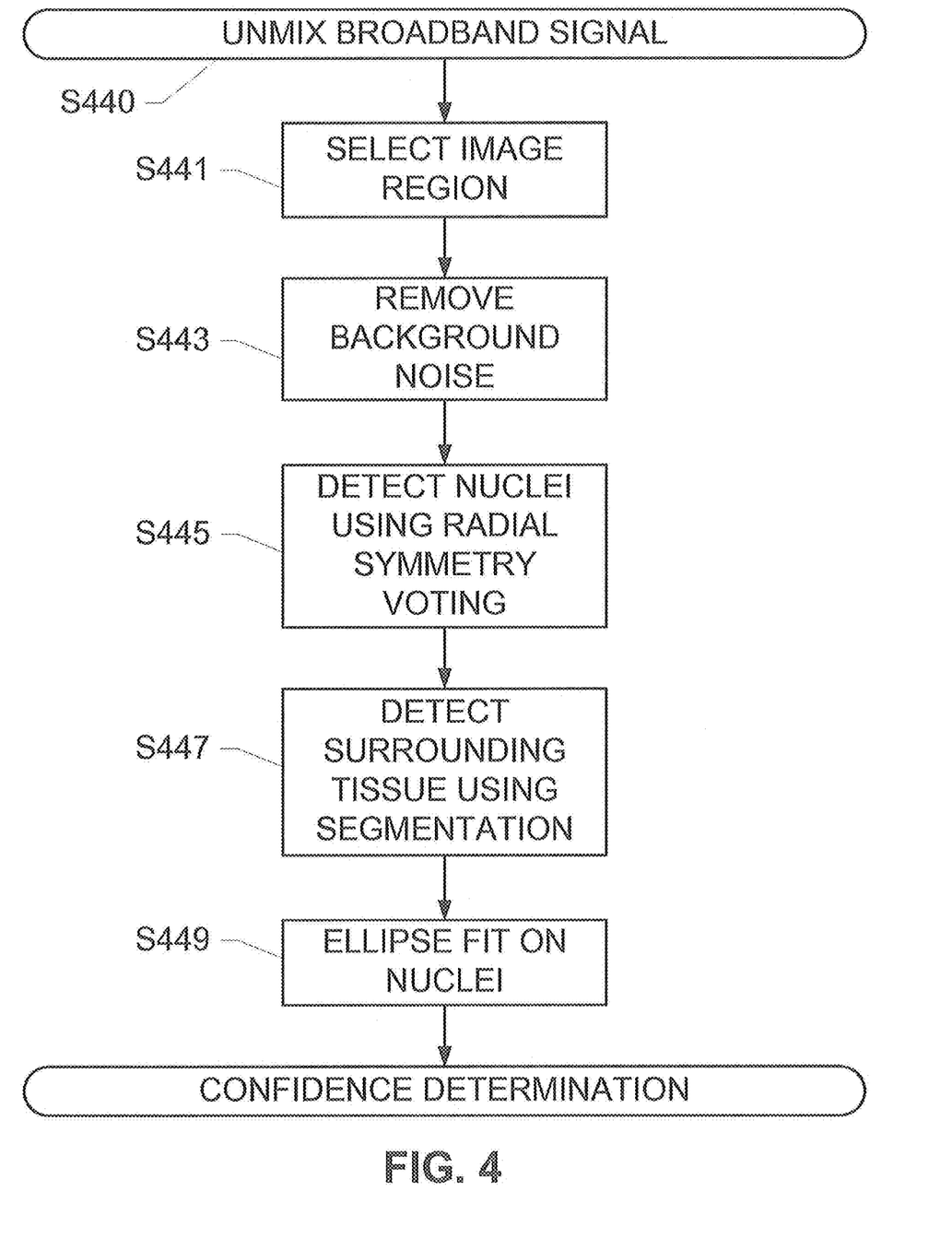
FIG. 4 shows a method for detecting structures in a broadband signal of an image, according to an exemplary embodiment of the present subject disclosure.

FIG. 4 shows a method for detecting structures in a broadband signal of an image, according to an exemplary embodiment of the present subject disclosure. The method of FIG. 4 may be performed by a computer executing modules similar to those depicted in FIG. 1. The method begins with an initial unmixing operation (S440) using an initial reference spectra, resulting in at least one unmixed broadband signal. A region of the image may be selected (S441) for nuclei detection (S445) and segmentation (S447). For instance, the image may be delineated into one or more regions automatically or manually, as described herein. Structures within a distance of one or more grid vertices may be sampled for estimated reference spectra, as shown in FIG. 3A. Upon selection of the image region, morphological operations may be performed (S443) to remove background noise, and to determine foreground of nuclei. The center of each nucleus may be determined using methods such as radial symmetry voting (S445). For instance, given the unmixed broadband channel, an image magnitude is computed from the channel, and one or more votes at each pixel are accumulated by adding the summation of the magnitude within a selected region. Mean shift clustering may be used to find the local centers in the region, with the local centers representing actual nuclear locations.

The detected nuclei may be further segmented from surrounding tissue (S447). Segmentation uses the centers of the nuclei determined in S445 to perform morphological operations (such as dilation to expand the region and erosion to remove the isolated noise and shrink the region) on a region adjacent the nuclei to obtain the surrounding tissue. Local thresholding may be performed to segment the entire nucleus. As the intensities of the nuclear pixels are higher than those in its neighborhood, an intensity cut-off/threshold can be used to separate the nuclei and neighborhood background regions. Model based segmentation and other operations such as pixel-wise classification using K-mean method may also be performed. With the nuclei and surrounding tissues being detected and segmented, an ellipse fitting operation (S449) may be performed on each nucleus to enable subsequent confidence determination and ranking operations. Since most nuclei are round and/or elliptical in shape, a robust ellipse fitting algorithm based on random sample consensus (RANSAC) may be executed to fit an ellipse on top of each segmented nucleus. Upon fitting an elliptical mask on each nucleus, subsequent confidence level determination operations may be executed. An example ellipse fitting method is as follows:

Let $\vec{x}_i = (x_i, y_i)$ be the landmarks along the boundary of the nucleus. Minimize the sum of squared algebraic distances $d(\vec{a}) = \sum_{i=1}^{N} \vec{a} \cdot \vec{x}_i$ and solve for the parameters of the ellipse model $\vec{a}$, where $\vec{a} \cdot \vec{x}_i = ax^2 + bxy + cy^2 + ey + f$, and $\vec{a} = (a, b, c, d, e, f)$ representing parameters of the ellipse.

Figure 5:
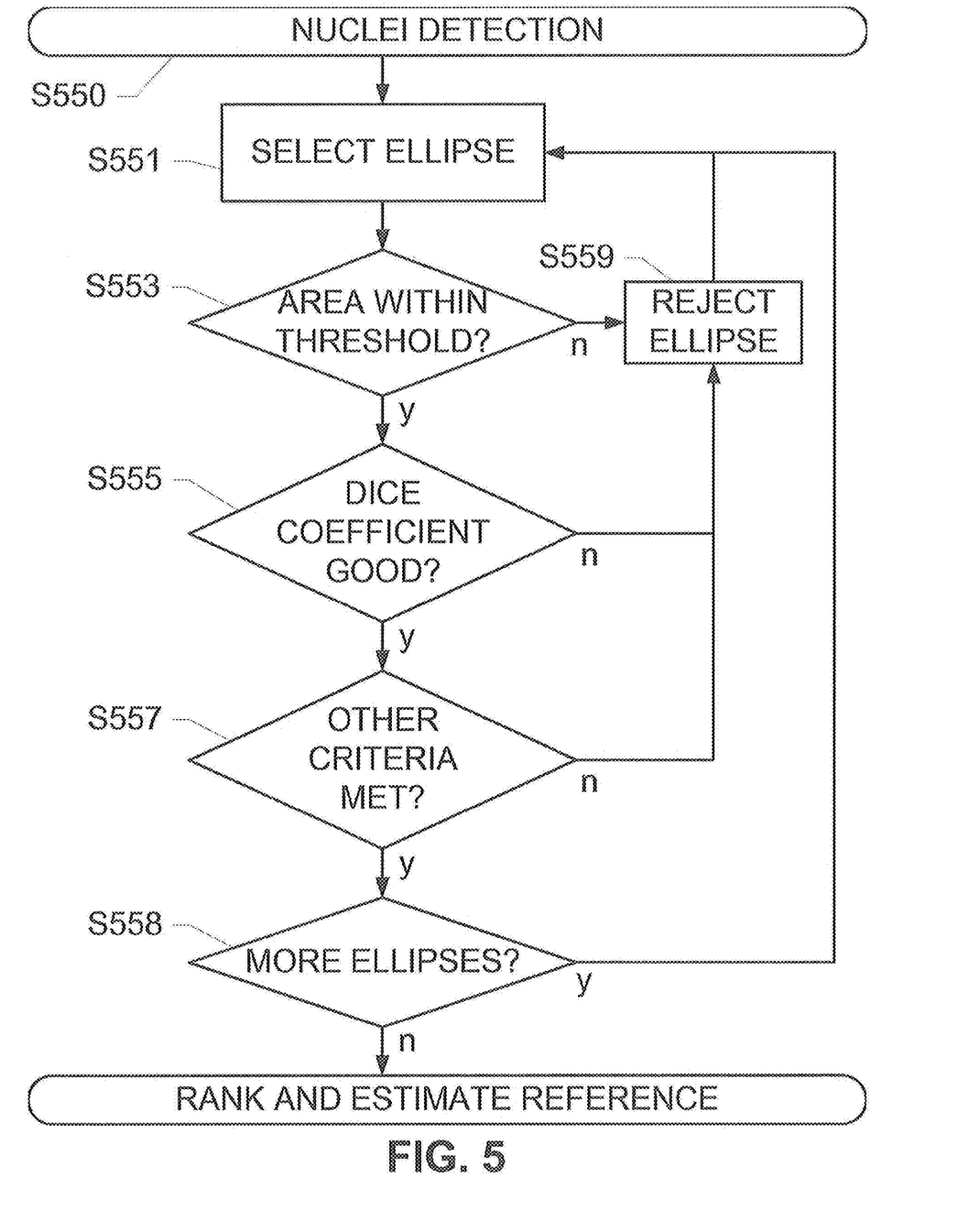
FIG. 5 shows a method for determining a confidence level of detected structures, according to an exemplary embodiment of the present subject disclosure.

FIG. 5 shows a method for determining a confidence level of detected structures, according to an exemplary embodiment of the present subject disclosure. The confidence level may be based on a plurality of factors, including shape and intensity information and biological criteria. The method begins with a result of a nuclear component detection process S550 as described above, with detected nuclei being segmented and fitted with elliptical masks. Each nucleus is observed independently, with an ellipse being selected (S551) prior to performing confidence level determinations. For instance, an area of the ellipse is computed (S553), and if the area is larger or smaller than a threshold, the ellipse may be rejected (S559). This operation also includes determining an elongation of the ellipse, i.e. a ratio of a long axis to a short axis of the ellipse, with any ratio being above or below a threshold resulting in the ellipse being rejected (S559). For example, a maximum threshold value may be 2. If the area and elongation of the ellipse meet the threshold standards, then the ellipse fit is scored (S555) using a DICE coefficient as shown below:

$$DICE = \frac{2|V(p) - V(q)|}{V(p) + V(q)} \frac{2|V(p) \cap V(q)|}{V(p) + V(q)}$$

where V is an area operator, p is a binary image of the segmented nucleus, and q is the elliptical mask.

The nucleus may be scored and ranked (S555) based on the DICE coefficient, and scores lower than a threshold may be rejected (S559). In one exemplary embodiment, a threshold DICE ratio is 0.9. Ellipses meeting this threshold (i.e. scoring 0.9 or higher) may be subject to additional criteria (S557) before being approved, such as meeting biological constraints. These may include requiring that the detected structure is not co-located with quantum dots or other biomarkers besides the broadband signal, or does not overlap with other stains. If these conditions are not met, the ellipse may still be rejected (S559). If these constraints are met, then the method determines if there are additional ellipses within the region to be scored (S558). If there are additional ellipses, the method starts again with the selection of the next ellipse (S551). If there are no more ellipses, the method can continue to perform additional operations such as ranking and estimating the reference spectra from the accepted structures.

Figure 6:
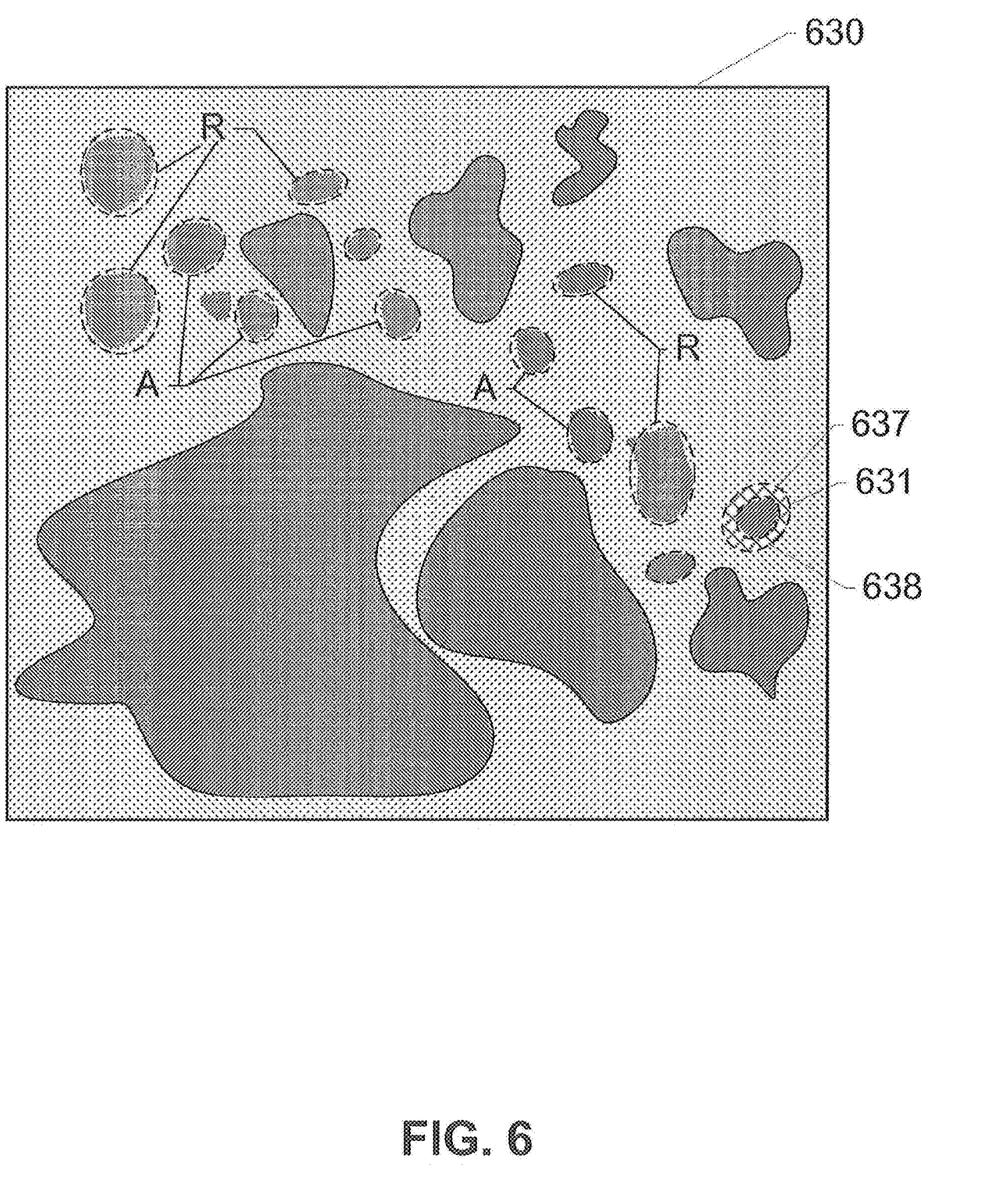
FIG. 6 shows a nuclear ranking using ellipse fitting, according to an exemplary embodiment of the present subject disclosure.

FIG. 6 shows a nuclear ranking using ellipse fitting, according to an exemplary embodiment of the present subject disclosure. Image 630 depicts a specimen scanned from a slide comprising a plurality of stained structures 631. For example, the specimen may include a tissue section, such as a formalin-fixed, paraffin-embedded tissue specimen, and may have been obtained from a human or animal subject. The specimen may be living cellular tissue, frozen cells, tumor cells, blood, throat culture, or other; the type or nature of specimen is not particularly important. The structures may be tissue cells, nuclei, cancer cells, or any other structure. An ellipse 637 is fit over a structure 631, and each ellipse may be scored and ranked based on a plurality of thresholds that are applied to the ellipse, as described herein. For instance, ellipses that have a DICE coefficient of less than 0.9 may be rejected, as marked with an "R" in FIG. 6. Ellipses that score higher than 0.9 and that meet additional biological criteria may be accepted and marked with "A". Further, an elongation of an ellipse may be subject to thresholds, with extremely elongated ellipses being rejected, based on an assumption that most nuclei are close to spherical in shape. Intensity constraints may also be applied to the detected nuclei prior to acceptance or rejection. For example, if the intensity of the nuclei pixels is less than 0.1 determined by mean intensity−2*standard deviation of intensity, then the nucleus may not be accepted.

Moreover, tissue auto-fluorescence regions are generally found in the neighborhood of the nuclei. With the high confidence nuclei being marked as accepted, a small neighborhood within a few pixels around a nucleus is designated as the tissue region, as shown in by ring 638 around the fitted ellipse 637. As the nuclear ranking procedure ensures the segmentation of nuclei and tissue regions, broadband spectra including DAPI and AF may be estimated from these regions, with reference spectra matrix A being generated or updated accordingly. Subsequent unmixing and estimation steps described above may be recursively applied until the broad-band reference spectra stabilize or the maximum number of iterations is exceeded. Median reference spectra for the image or for selected regions of the image may be stored in an optimized reference spectra matrix.

Figure 7:
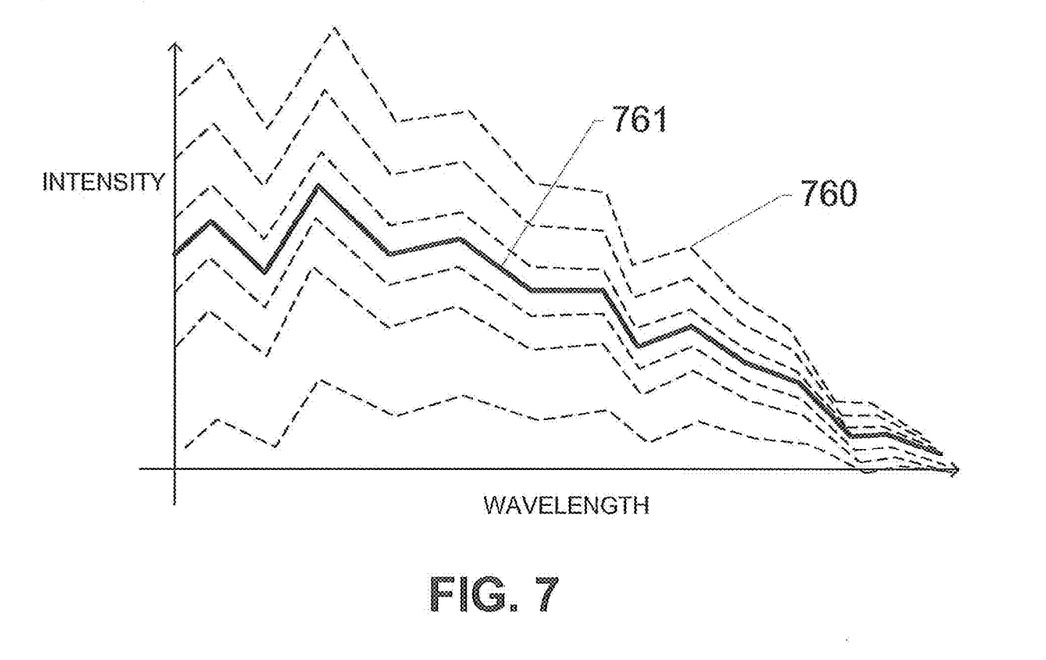
FIG. 7 shows a median reference spectrum estimated from a plurality of highly-ranked structures, according to an exemplary embodiment of the subject disclosure.

FIG. 7 shows a graph identifying a median reference spectrum estimated from a plurality of highly-ranked structures, according to an exemplary embodiment of the subject disclosure. Each single nucleus is estimated to have a reference spectra identified by dashed lines 760. For a specific region of the image, a median of the reference spectra for each nucleus within that region is computed and depicted as solid line 761 which is the median of all the dashed lines 760. This is used as the generated reference spectra for that region in an updated reference matrix A. Alternatively or in addition, FIG. 7 may represent a plurality of reference spectra 760 determined for a corresponding plurality of iterations of the optimization process, with the resulting median reference spectrum 761 representing the optimized reference spectrum. The optimized reference spectra are used to properly unmix the image, resulting in improved results.

Figure 8:
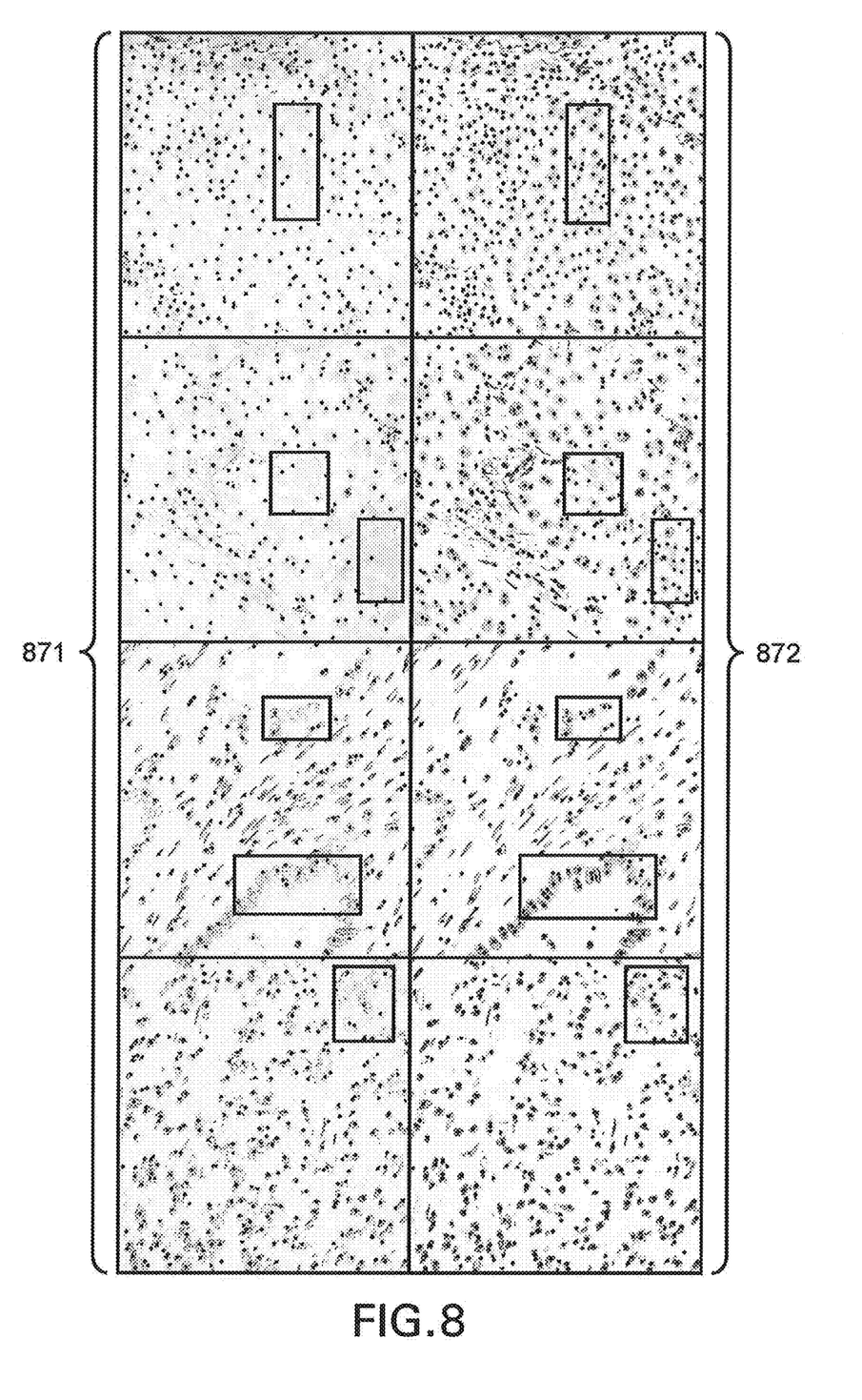
FIG. 8 shows a comparison of nuclear detection results using an initial reference spectra versus an updated reference spectra, according to exemplary embodiments of the subject disclosure.

FIG. 8 shows a comparison of nuclear detection results using initial reference spectra versus updated reference spectra, according to exemplary embodiments of the subject disclosure. Resulting images 871 shown in the left column depict nuclei detected in a broadband channel that is unmixed using a standard reference spectra derived from a control image. Results 872 in the right column show nuclei detected after an adaptive unmixing process as described in the disclosed embodiments. It is evident that in each region, there are improved nuclear detections using optimized reference spectra versus using standard reference spectra.

The disclosed image analysis operations such as improvements in estimation of the broadband reference spectra obtained using improved identification of cells minimize differences between the observed spectral image or hyperspectral image datasets and the estimated matrix performed by existing methods, while obtaining estimates of the broadband signatures such as AF and DAPI particular to the image. Other broadband signatures, for example, those of red blood cells may also be optimized. The disclosed systems and methods are highly suitable for vessel detection and macrophage segmentation, as the methods will provide more accurate spectral unmixing results and sharper and cleaner DAPI channels. Both vessel detection and macrophage segmentation require an accurate estimation of the nuclei (stained by DAPI) as the first step. The method of the present invention is also applicable to in situ hybridization (ISH) images. ISH is a useful technique for spatially localizing certain probes/targets within tissues and cells, which provide information about gene expression and genetic loci. The probes can be in the form of fluorescent markers (as in FISH) or chromogenic markers (as in CISH). For both cases, the adaptive unmixing method of the present invention may be applied to FISH images or CISH images to obtain, for example, improved estimates of a nuclear marker's signature. Due to staining variations, the signature for a nucleus can vary and a best estimate of this nucleus channel can differ significantly per image. However, the adaptive unmixing method of the present invention, which may be for DAPI estimates in fluorescent images, is also used to identify a group of top ranked shaped cells in FISH and CISH images. Further, a statistical averaging over these shaped cells (for example computing a median of the reference spectrum of the top ranked shaped cells, in accordance with the present invention) gives an improved estimate of the nucleus reference spectra or reference colors. As such, the adaptive umixing method of the present invention, which uses physically meaningful structures to obtain more reliable estimates of reference vectors, is applicable for both brightfield and fluorescent images, for example chromogenic brightfield or darkfield IHC images, chromagenic ISH brightfield or darkfield images, fluorescent ISH images, and/or quantum dot images. Moreover, besides medical applications such as anatomical or clinical pathology, prostate/lung cancer diagnosis, etc., the same methods may be performed to analyze other types of samples such as remote sensing of geologic or astronomical data, etc. Images may be further refined by eliminating known or obvious sources of noise by, for instance, being compared to known or ideal sets of signals from similar materials. Other refinement processes include adjusting a minimum or a maximum of intensities to highlight a specific range and eliminating signals outside the range, adjusting a contrast to see a more dynamic range, and other imaging operations. For large or multiple slide/image analysis, or for analyzing one or more image cubes, the operations described herein may be ported into a hardware graphics processing unit (GPU), enabling a multi-threaded parallel implementation.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents. Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A non-transitory computer-readable medium storing computer-executable instructions which, when executed by one or more processors, cause the one or more processors to perform operations comprising:
   accessing an image of a biological sample, wherein the image comprises a mixture of signals;
   utilizing an initial reference vector to unmix a first region of the image to generate an unmixed first region of the image;
   processing the unmixed first region of the image using a segmentation operation to detect a plurality of structures within the unmixed first region, wherein each structure of the plurality of structures corresponds to a tissue type;
   generating an updated reference vector for the unmixed first region based on the plurality of structures; and
   utilizing the updated reference vector to unmix the image.

2. The non-transitory computer-readable medium of claim 1, wherein the initial reference vector is retrieved from a control image.

3. The non-transitory computer-readable medium of claim 2, wherein the plurality of structures are detected via radial symmetric voting and/or via segmentation between a plurality of nuclei and a plurality of tissue cells.

4. The non-transitory computer-readable medium of claim 2, wherein the operations further comprise ranking the plurality of structures based on biological criteria comprising at least on one location in a pure 4',6-diamidino-2-phenylindole (DAPI) region, a hematoxylin region, a non-overlapping nucleus, a size threshold and an ellipse fit.

5. The non-transitory computer-readable medium of any of claim 4, wherein the operations further comprise determining a confidence level for each of the plurality of structures.

6. The non-transitory computer-readable medium of claim 5, wherein the operations further comprise estimating the updated reference vector from a subset of the plurality of structures that meets a confidence level threshold.

7. The non-transitory computer-readable medium of claim 6, wherein the confidence level threshold is based in part on a DICE ratio associated with the ellipse fit.

8. The non-transitory computer-readable medium of claim 6, wherein the operations further comprise estimating the updated reference vector from a region adjacent to one or more structures of the subset of the plurality of structures.

9. The non-transitory computer-readable medium of claim 1, wherein the operations further comprise repeatedly unmixing the image and updating the initial reference vector, until an optimal reference spectrum is achieved.

10. The non-transitory computer-readable medium of claim 1, wherein the mixture of signals comprises at least one of a 4',6-diamidino-2-phenylindole (DAPI) signal, an autofluorescence signal, and a hematoxylin (HTX) signal.

11. A system for unmixing an image, comprising:
one or more processors; and
at least one memory communicatively coupled to the one or more processors, the at least one memory storing computer-executable instructions that, when executed by the one or more processors, cause the one or more processors to perform operations comprising:
accessing an image of a specimen;
identifying, from the image, an unmixed signal corresponding to a stain;
detecting a plurality of structures by analyzing the identified unmixed signal;
estimating a reference vector for the stain based on a subset of the plurality of structures;
unmixing the image using the estimated reference vector; and
repeating the identifying, detecting, estimating, and unmixing steps for a predetermined number of iterations or until an optimal reference vector is obtained.

12. The system of claim 11, wherein said plurality of structures comprise a plurality of nuclei.

13. The system of claim 12, wherein said the subset of the plurality of structures comprise a subset of the plurality of nuclei that meets a confidence level threshold.

14. The system of claim 13, wherein the operations further comprise delineating the image into a plurality of regions, and wherein the subset of the plurality of nuclei is located within a first region of the plurality of regions.

15. The system of claim 14, wherein the operations further comprise unmixing a second region of the plurality of regions using the reference vector.

16. A method comprising:
unmixing an image comprising a mixture of signals to generate one or more unmixed signals;
detecting a plurality of structures in the unmixed signals;
ranking the plurality of structures in order of a confidence level;
estimating a reference vector for at least one signal in the mixture of signals based at least on a subset of structures among the plurality of structures, wherein the subset of structures have a confidence level higher than a threshold confidence level;
storing the reference vector in a reference matrix associated with the image; and
subsequently unmixing the image using the reference matrix.

17. The method of claim 16, further comprising repeating the detecting, ranking, estimating, and subsequent unmixing until an optimal reference vector is obtained.

18. The method of claim 16, wherein subsequently unmixing the image using the reference matrix includes unmixing a region of the image using the reference vector.

19. The method of claim 16, wherein the reference vector is estimated by using a median signal of the mixture of signals.

20. The method of claim 16, wherein the confidence level is determined based on shape and intensity data corresponding to a structure of the plurality of structures.

\* \* \* \* \*